US011250689B2

(12) United States Patent
Chen

(10) Patent No.: US 11,250,689 B2
(45) Date of Patent: Feb. 15, 2022

(54) ALARM APPARATUS AND METHOD FOR USING THE ALARM APPARATUS

(71) Applicant: ZHUHAI HENGYU NEW TECHNOLOGY CO., LTD., Zhuhai (CN)

(72) Inventor: Junjian Chen, Zhuhai (CN)

(73) Assignee: ZHUHAI HENGYU NEW TECHNOLOGY CO., LTD., Zhuhai (CN)

( * ) Notice: Subject to any disclaimer, the term of this patent is extended or adjusted under 35 U.S.C. 154(b) by 111 days.

(21) Appl. No.: 16/768,312

(22) PCT Filed: May 7, 2018

(86) PCT No.: PCT/CN2018/000165
§ 371 (c)(1),
(2) Date: May 29, 2020

(87) PCT Pub. No.: WO2019/104820
PCT Pub. Date: Jun. 6, 2019

(65) Prior Publication Data
US 2021/0201653 A1    Jul. 1, 2021

(30) Foreign Application Priority Data

Nov. 30, 2017   (CN) .......................... 201711238687.2

(51) Int. Cl.
*G08B 25/01* (2006.01)
*H04W 4/029* (2018.01)
(Continued)

(52) U.S. Cl.
CPC ............ *G08B 25/016* (2013.01); *F21S 8/085* (2013.01); *G06K 9/00771* (2013.01);
(Continued)

(58) Field of Classification Search
CPC .................................................. G08B 25/016
See application file for complete search history.

(56) References Cited

U.S. PATENT DOCUMENTS

2010/0295943 A1   11/2010   Cha et al.
2015/0057016 A1*  2/2015   Moshfeghi ........... H04B 5/0043
                                                                 455/456.1
(Continued)

FOREIGN PATENT DOCUMENTS

CN        202102604 U       1/2012
CN        103034193 A       4/2013
(Continued)

*Primary Examiner* — Travis R Hunnings
(74) *Attorney, Agent, or Firm* — Bayramoglu Law Offices LLC

(57) ABSTRACT

An alarm apparatus includes a mobile terminal, a plurality of streetlamps, a server, and a management center. The mobile terminal includes a microprocessor, a display screen, a first GPS positioning module, a battery, an emergency call button, a first GPRS communication module, a first wireless communication module, a first camera, a loudspeaker, and a microphone. The streetlamp includes a central processor, a power supply, a second camera, a mobile device, a second
(Continued)

GPS positioning module, a second wireless communication module, and a second GPRS communication module. The caller sends a distress signal to the streetlamp. The streetlamp is automatically illuminated and the direction of the camera is adjusted to the escape direction of the suspect. All streetlamps located on the escape route of the suspect are turned on to capture the escape route of the suspect. The streetlamp sends the information to the management center by means of the server.

9 Claims, 2 Drawing Sheets

(51) Int. Cl.
    *H04W 4/90*          (2018.01)
    *H04M 1/72424*     (2021.01)
    *F21S 8/08*          (2006.01)
    *G06K 9/00*         (2006.01)
    *G08B 25/00*        (2006.01)
    *G08B 25/10*        (2006.01)

(52) U.S. Cl.
    CPC ........... *G08B 25/009* (2013.01); *G08B 25/10* (2013.01); *H04M 1/72424* (2021.01); *H04W 4/029* (2018.02); *H04W 4/90* (2018.02)

(56) References Cited

U.S. PATENT DOCUMENTS

| | | | |
|---|---|---|---|
| 2015/0245167 A1* | 8/2015 | Bobrow | H04L 41/12 455/41.2 |
| 2016/0127871 A1* | 5/2016 | Smith | G01C 17/02 455/456.6 |
| 2018/0139571 A1* | 5/2018 | Moshfeghi | H04B 5/0043 |

FOREIGN PATENT DOCUMENTS

| | | |
|---|---|---|
| CN | 105045084 A | 11/2015 |
| CN | 204990647 U | 1/2016 |
| CN | 106539574 A | 3/2017 |
| CN | 106603981 A | 4/2017 |
| CN | 106652333 A | 5/2017 |
| CN | 106764833 A | 5/2017 |
| CN | 206145534 U | 5/2017 |
| EP | 3155317 A2 | 4/2017 |
| JP | 2007329757 A | 12/2007 |
| KR | 101056018 B1 | 8/2011 |
| KR | 20120053706 A | 5/2012 |
| KR | 20150135948 A | 12/2015 |
| WO | 2008048059 A1 | 4/2008 |
| WO | 2017021853 A1 | 2/2017 |

* cited by examiner

A1: pressing the emergency call button on the mobile terminal by a user and inputting a distress signal;

A2: detecting the distress signal and controlling the first wireless communication module by the microprocessor to send the distress signal and a location signal to the second wireless communication module;

A3: receiving the distress signal and the location signal by the central processor through the second wireless communication module, and performing an internal analysis and judgment; then, controlling the mobile device by the central processor to adjust a capturing direction of the camera to a route, wherein a suspect moves along the route toward a position of the streetlamp, and sending the distress signal and the location signal by the central processor to the server, and sending the signals by the server to the management center; and

A4: turning on all the streetlamps located on an escape route of the suspect by the server, starting the second camera on the streetlamp by the server to capture the escape route of the suspect, sending captured information by the streetlamp to the server through the second GPRS communication module, and sending the captured information by the server to the management center to trace a real-time escape route of the suspect.

FIG. 2

ALARM APPARATUS AND METHOD FOR USING THE ALARM APPARATUS

CROSS REFERENCE TO THE RELATED APPLICATIONS

This application is the national phase entry of International Application No. PCT/CN2018/000165, filed on May 7, 2018, which is based upon and claims priority to Chinese Patent Application No. 201711238687.2, filed on Nov. 30, 2017, the entire contents of which are incorporated herein by reference.

TECHNICAL FIELD

The present invention relates to the field of security technology, and in particular, to an alarm apparatus and a method for using the alarm apparatus.

BACKGROUND

Current mobile phones typically do not have a function for sending a distress signal. Some mobile phones on the market can call for help through continuously broadcasting a distress signal, but it is of no use in tracing a suspect due to the poor alarm effect. This may be especially true in areas where signals are weak, such as densely populated or remote areas, where distress signals are often not responded to or ignored. Thus, police cannot determine where or what route a fleeing suspect may take. Police are, therefore, required to find the relevant surveillance videos and watch them one by one, which is very inefficient and is more likely to cause delay in apprehending criminals. Women, children, the elderly, the sick and the disabled need to be made secure. The security of society's most vulnerable, as well as the security of the public at-large depends to a large extent on the governance hardware of the public security environment.

SUMMARY

In order to overcome the shortcomings of the prior art, the present invention provides an alarm apparatus and a method for using the alarm apparatus. The alarm apparatus has a simple structure and low cost. The present invention has a simple structure and low cost, improves the emergency call channel and security performance, quickly spots the escape route of the suspect, automatically turns on all the streetlamps located on the escape route of the suspect, and records the escape process of the suspect by using the camera, which is convenient to use.

The technical solution adopted by the present invention is as follows.

An alarm apparatus, includes:

at least one mobile terminal, wherein the mobile terminal includes a microprocessor, a display screen electrically connected to the microprocessor, a first global position system (GPS) positioning module electrically connected to the microprocessor, a battery electrically connected to the microprocessor, an emergency call button electrically connected to the microprocessor, a first general packet radio service (GPRS) communication module electrically connected to the microprocessor, a first wireless communication module electrically connected to the microprocessor, a first camera electrically connected to the microprocessor, a loudspeaker electrically connected to the microprocessor, and a microphone electrically connected to the microprocessor;

a plurality of streetlamps, wherein the streetlamp includes a central processor, a power supply electrically connected to the central processor, a second camera electrically connected to the central processor, a mobile device electrically connected to the central processor, a second GPS positioning module electrically connected to the central processor, a second wireless communication module electrically connected to the central processor, and a second GPRS communication module electrically connected to the central processor;

a server, wherein the server is connected to the mobile terminal through wireless communication, and the server is connected to the streetlamp through wireless communication; and a management center, wherein the management center is connected to the mobile terminal and the server through wireless communication.

The camera is fixedly installed on the mobile device.

The mobile device includes a housing, a driving motor fixedly installed on the housing, and a rotating table connected to the driving motor. The camera is fixedly installed on the rotating table. The management center includes a computer and a GPRS wireless communication module.

The streetlamp includes a luminous lamp, and the luminous lamp is electrically connected to the central processor.

A method for using the alarm apparatus includes the following steps:

A1: pressing the emergency call button on the mobile terminal by a user and inputting a distress signal;

A2: detecting the distress signal and controlling the first wireless communication module by the microprocessor to send the distress signal and a location signal to the second wireless communication module;

A3: receiving the distress signal and the location signal by the central processor through the second wireless communication module, and performing an internal analysis and judgment; then, controlling the mobile device by the central processor to adjust a capturing direction of the camera to a route, wherein a suspect moves along the route toward a position of the streetlamp, and sending the distress signal and the location signal by the central processor to the server, and sending the signals by the server to the management center; and A4: turning on all the streetlamps located on an escape route of the suspect by the server, starting the second camera on the streetlamp by the server to capture the escape route of the suspect, sending captured information by the streetlamp to the server through the second GPRS communication module, and sending the captured information by the server to the management center to trace a real-time escape route of the suspect.

Step A3 further includes: controlling the second GPRS communication module by the central processor to send the distress signal and the location signal to the server, and sending the distress signal and the location signal by the server to the management center.

According to the settings of the software, the second camera can recognize the face of the suspect according to the face recognition technology to obtain the escape route of the suspect more accurately. The management center is generally managed by the police station, and the police can monitor the escape route of the suspect in real time, and then arranges the law enforcement officers to arrest the suspect.

The present invention has a simple structure and low cost, improves the emergency call channel and security performance, quickly spots the escape route of the suspect, automatically turns on all the streetlamps located on the escape route of the suspect, and records the escape process of the suspect by using the camera, which is convenient to use.

BRIEF DESCRIPTION OF THE DRAWINGS

FIG. 2 is a flow chart of the steps of the present invention.

DETAILED DESCRIPTION OF THE EMBODIMENTS

Figure 1:
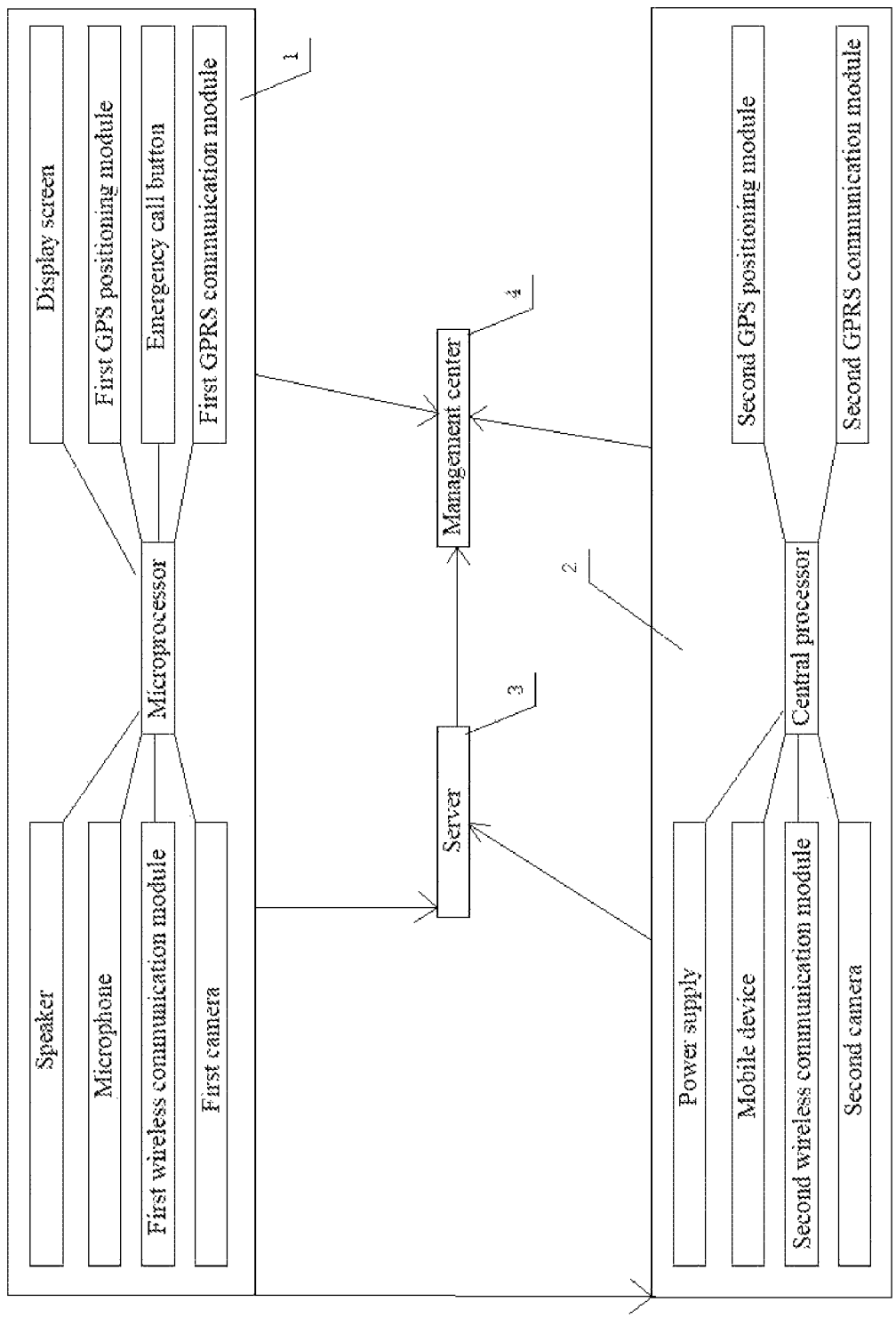
FIG. 1 is a schematic diagram showing the structure of the present invention.

As shown in FIGS. 1 and 2, an alarm apparatus of the present invention includes: at least one mobile terminal, wherein the mobile terminal includes a microprocessor, a display screen electrically connected to the microprocessor, a first GPS positioning module electrically connected to the microprocessor, a battery electrically connected to the microprocessor, an emergency call button electrically connected to the microprocessor, a first GPRS communication module electrically connected to the microprocessor, a first wireless communication module electrically connected to the microprocessor, a first camera electrically connected to the microprocessor, a loudspeaker electrically connected to the microprocessor, and a microphone electrically connected to the microprocessor;
a plurality of streetlamps, wherein the streetlamp includes a central processor, a power supply electrically connected to the central processor, a second camera electrically connected to the central processor, a mobile device electrically connected to the central processor, a second GPS positioning module electrically connected to the central processor, a second wireless communication module electrically connected to the central processor, and a second GPRS communication module electrically connected to the central processor;
a server, wherein the server is connected to the mobile terminal through wireless communication, and the server is connected to the streetlamp through wireless communication; and
a management center, wherein the management center is connected to the mobile terminal and the server through wireless communication.

The camera is fixedly installed on the mobile device.
The mobile device includes a housing, a driving motor fixedly installed on the housing, and a rotating table connected to the driving motor. The camera is fixedly installed on the rotating table. The management center includes a computer and a GPRS wireless communication module.
The streetlamp includes a luminous lamp, and the luminous lamp is electrically connected to the central processor.
A method for using the alarm apparatus includes the following steps.
A1. The user presses the emergency call button on the mobile terminal and inputs a distress signal.
A2. The microprocessor detects the emergency call, and controls the first wireless communication module to send the distress signal and a location signal to the second wireless communication module.
A3. The central processor receives the distress signal and the location signal through the second wireless communication module, and performs an internal analysis and judgment. Then, the central processor controls the mobile device to adjust the capturing direction of the camera to the route along which the suspect moves to the position of the streetlamp, and sends the distress signal and the location signal to the server, and the server sends the signals to the management center.
A4. The server turns on all the streetlamps located on the escape route of the suspect, and starts the second camera on the streetlamp to capture the escape route of the suspect. The streetlamp sends the captured information to the server through the second GPRS communication module, and the server sends the captured information to the management center to trace the real-time escape route of the suspect.
Step A3 further includes: the central processor controls the second GPRS communication module to send the distress signal and the location signal to the server, and the server sends the distress signal and the location signal to the management center.
According to the settings of the software, the second camera can recognize the face of the suspect according to the face recognition technology to obtain the escape route of the suspect more accurately. The management center is generally managed by the police station, and the police can monitor the escape route of the suspect in real time, and then arranges the law enforcement officers to arrest the suspect.
The present invention has a simple structure and low cost, improves the emergency call channel and security performance, quickly spots the escape route of the suspect, automatically turns on all the streetlamps located on the escape route of the suspect, and records the escape process of the suspect by using the camera, which is convenient to use.

What is claimed is:
1. An alarm apparatus, comprising:
at least one mobile terminal, wherein the mobile terminal comprises a microprocessor, a display screen electrically connected to the microprocessor, a first global position system (GPS) positioning module electrically connected to the microprocessor, a battery electrically connected to the microprocessor, an emergency call button electrically connected to the microprocessor, a first communication module electrically connected to the microprocessor, a first wireless communication module electrically connected to the microprocessor, a first camera electrically connected to the microprocessor, a loudspeaker electrically connected to the microprocessor, and a microphone electrically connected to the microprocessor;
a plurality of streetlamps, wherein each streetlamp of the plurality of streetlamps comprises a central processor, a power supply electrically connected to the central processor, a second camera electrically connected to the central processor, a mobile device electrically connected to the central processor, a second GPS positioning module electrically connected to the central processor, a second wireless communication module electrically connected to the central processor, and a second communication module electrically connected to the central processor;
a server, wherein the server is connected to the mobile terminal through wireless communication, and the server is connected to the plurality of streetlamps through wireless communication; and
a management center, wherein the management center is connected to the mobile terminal and the server through wireless communication.
2. The alarm apparatus of claim 1, wherein, the second camera is fixedly installed on the mobile device, and each of the first communication module and the second communication module is a GPRS communication module.

3. The alarm apparatus of claim 2, wherein, the mobile device comprises a housing, a driving motor fixedly installed on the housing, and a rotating table connected to the driving motor; the second camera is fixedly installed on the rotating table; and the management center comprises a computer and a GPRS wireless communication module.

4. The alarm apparatus of claim 3, wherein, the each streetlamp comprises a luminous lamp, and the luminous lamp is electrically connected to the central processor.

5. A method for using the alarm apparatus of claim 1, comprising the following steps:
   step A1: pressing the emergency call button on the mobile terminal by a user and inputting a distress signal;
   step A2: detecting the distress signal and controlling the first wireless communication module by the microprocessor to send the distress signal and a location signal to the second wireless communication module;
   step A3: receiving the distress signal and the location signal by the central processor through the second wireless communication module, and performing an internal analysis and judgment, controlling the mobile device by the central processor to adjust a capturing direction of the camera to a route, wherein a suspect moves along the route toward a position of a streetlamp of the plurality of streetlamps, sending the distress signal and the location signal by the central processor to the server, and sending the distress signal and the location signal by the server to the management center; and
   step A4: turning on the plurality of streetlamps located on an escape route of the suspect by the server, starting the second camera on the plurality of streetlamps by the server to capture the escape route of the suspect, sending captured information by the plurality of streetlamps to the server through the second communication module, and sending the captured information by the server to the management center to trace a real-time escape route of the suspect.

6. The method of claim 5, wherein, the step A3 further comprises: controlling the second communication module by the central processor to send the distress signal and the location signal to the server, and sending the distress signal and the location signal by the server to the management center.

7. The method of claim 5, wherein, the second camera is fixedly installed on the mobile device, and each of the first communication module and the second communication module is a GPRS communication module.

8. The method of claim 7, wherein, the mobile device comprises a housing, a driving motor fixedly installed on the housing, and a rotating table connected to the driving motor; the second camera is fixedly installed on the rotating table; and the management center comprises a computer and a GPRS wireless communication module.

9. The method of claim 8, wherein, the each streetlamp comprises a luminous lamp, and the luminous lamp is electrically connected to the central processor.

\* \* \* \* \*